March 9, 1971   MIKIHIKO HANAI   3,568,255
AUTOMATIC PLASTIC CAP MOLDING MACHINE
Filed Feb. 6, 1968   7 Sheets-Sheet 1

Fig. 1.

INVENTOR.
Mikihiko Hanai
BY Oldham & Oldham
attys

United States Patent Office 3,568,255
Patented Mar. 9, 1971

3,568,255
AUTOMATIC PLASTIC CAP MOLDING MACHINE
Mikihiko Hanai, 8–7 4-chome, Kachidoki,
Chuo-ku, Tokyo, Japan
Filed Feb. 6, 1968, Ser. No. 703,308
Claims priority, application Japan, Mar. 29, 1967,
42/19,223
Int. Cl. A22b 5/08
U.S. Cl. 18—20    4 Claims

ABSTRACT OF THE DISCLOSURE

A rotary machine construction including an additional rotary disc which is interposed between the male- and female-mold carrying discs for rotation therewith and is so formed as to receive pairs of aligned male and female molds in their sequential operation under cam control. Molding and severing operation of increased accuracy is obtainable with this construction. The molds are to be replaceably mounted on the respective discs to enable the molding of caps in different shapes.

---

The present invention relates to apparatus for molding caps of different shapes from a heated ribbon or web of plastic material in an automatic fashion. It has previously been proposed to feed a heated plastic web between a pair of revolving molds carried by a revolving support, which molds are movable, during their rotation of the support, toward and away from each other to perform the intended molding operation. However, none of machines of this type previously built have been completely satisfactory particularly with respect to their molding accuracy and versatility in production.

BACKGROUND OF THE INVENTION

Prior work in this molding field is represented by my prior U.S. Pats. Nos. 26,045 and 3,418,691.

In view of this, the present invention has for its object the provision of a new and improved molding machine of the type described which is operable with increased efficiency and accuracy and in which molds are readily replaceable for convenience in fabricating articles of different shapes.

To attain this object, the inventor proposes to mount a pair of molds on respective rotary discs and interpose therebetween a supplementary moulding rotary disc which is so formed that the pair of molds may cooperate within if in a removable manner and interpose between the discs a supplementary rotary disc so formed as to enable the pair of molds to cooperate with each other within the confines of such supplementary disc.

Other objects and advantages of the present invention will be pointed out in, or be apparent from the description and claim, as will all the modifications of the embodiment shown in the drawings, in which:

Figure 1:
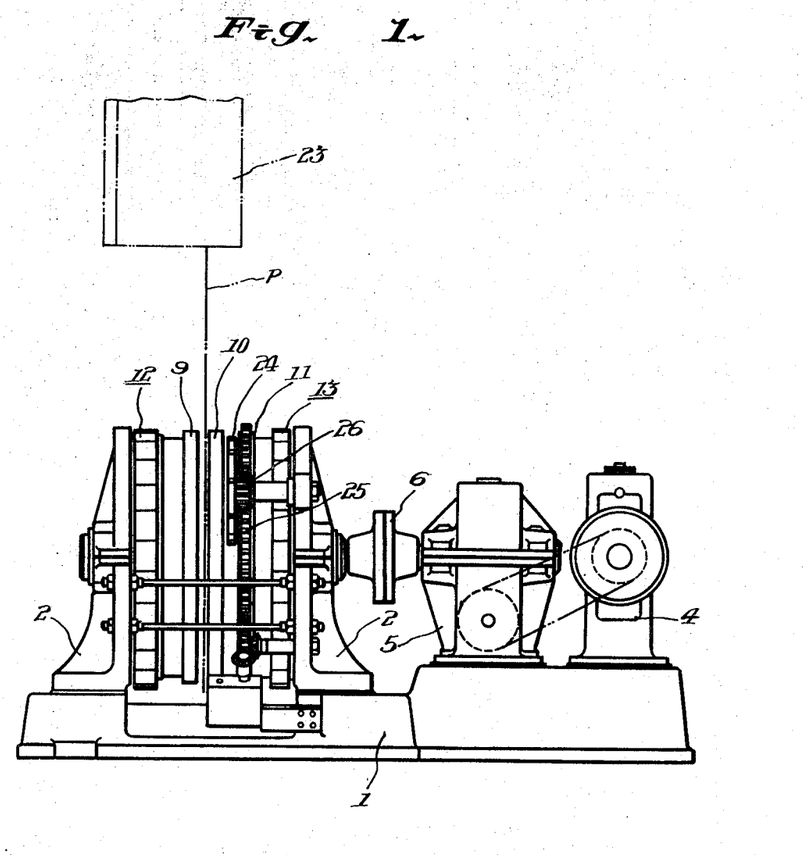
FIG. 1 is a side elevation of the apparatus embodying the present invention.

Referring to the drawings, reference numeral 1 indicates the base frame of the machine shown and 2 indicates support brackets mounted on the base frame in spaced opposite relation to each other. A rotative shaft 3 is horizontally mounted on the support brackets 2 and rotation is imparted to the shaft, as required, by way of a motor 4, a reduction gear 5 and coupling 6 or by any other appropriate means.

Figure 2:
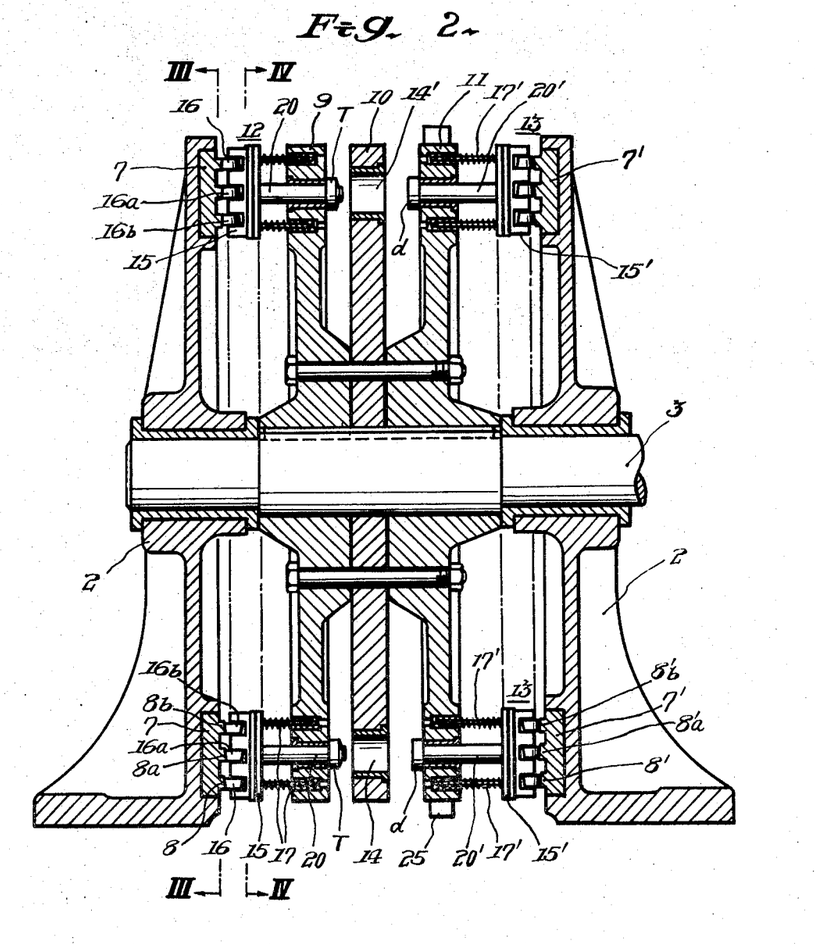
FIG. 2 is a longitudinal vertical cross section showing, on an enlarged scale, the major portion of the rotary molding structure of the machine shown in FIG. 1.
Figure 3:
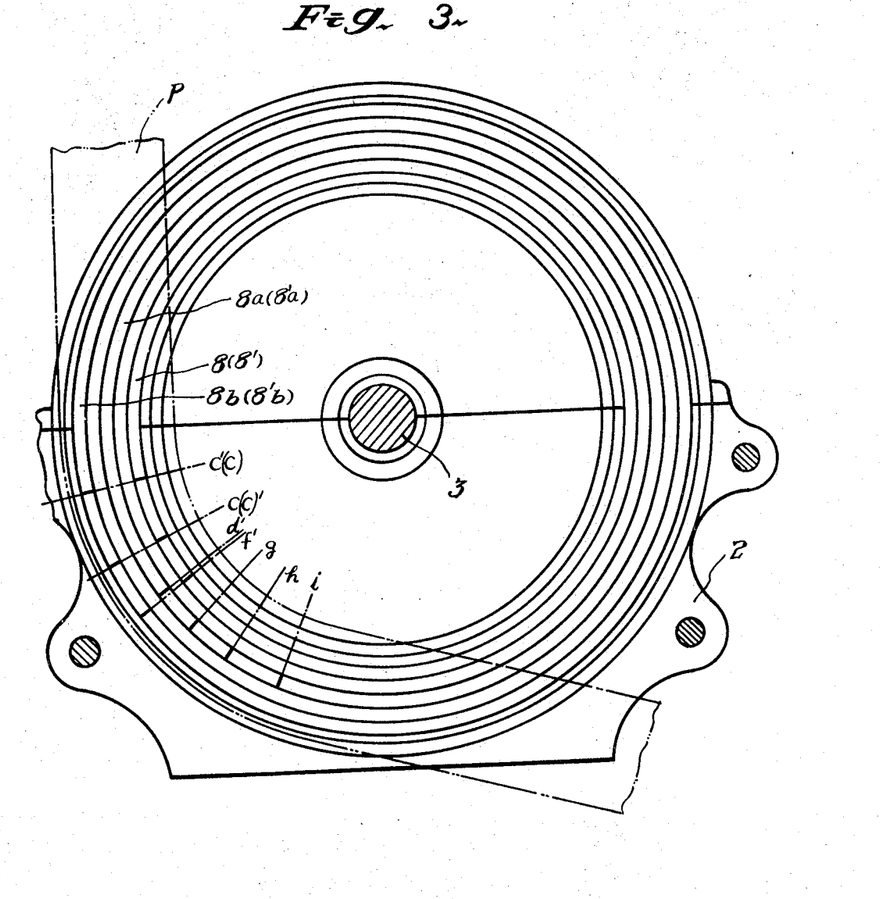
FIG. 3 is a transverse cross section taken along the line III—III in FIG. 2.
Figure 4:
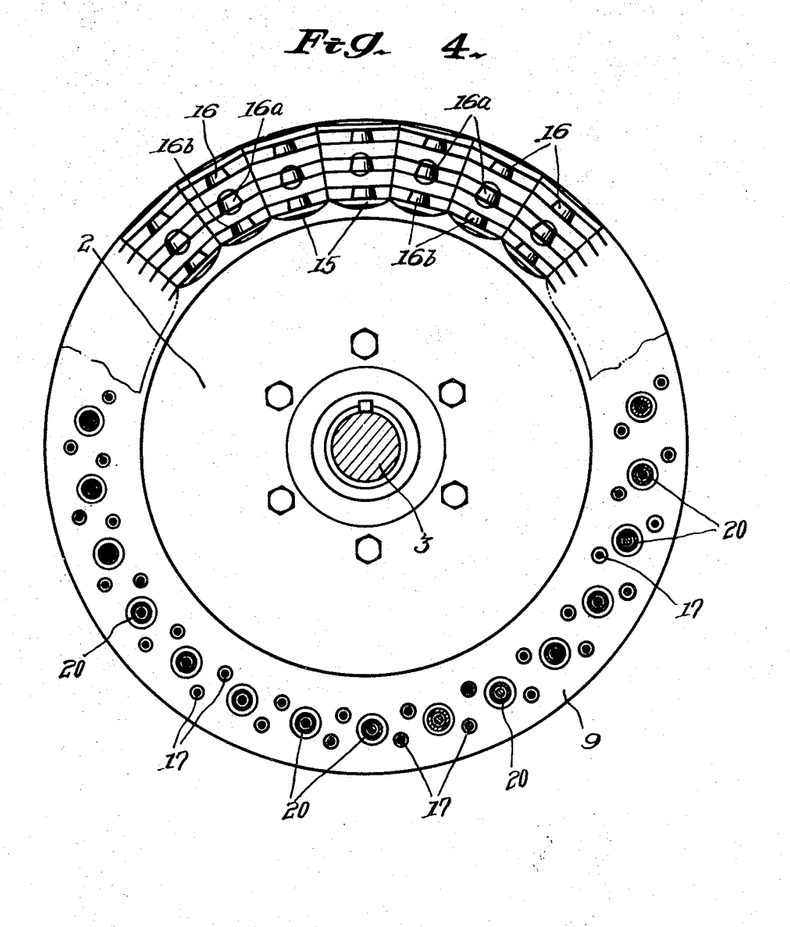
FIG. 4 is a transverse cross section taken along the line IV—IV in FIG. 2.

Annular frames 7 are fittedly secured to the inside of the respective support brackets 2 adjacent to their peripheral margins and are coaxial with the machine shaft or rotative shaft 3. One set of annular cams 8, 8a and 8b, shaped as described hereinafter, are formed on one of the annular frames 7 to extend inwardly and another set of annular cams 8', 8'a and 8'b are formed on the other annular frame 7' to extend inwardly beyond the inside surface thereof. Reference numeral 9 indicates a mold carrying disc or platen, 10 an intermediate, supplementary or molding disc and 11 a second mold carrying disc or platen, all of these discs being fixedly secured to the rotative shaft 3 in appropriate axially spaced relation to each other and to the annular cams 8, 8a and 8b on one side and 8', 8'a and 8'b on the other side.

Figure 5:
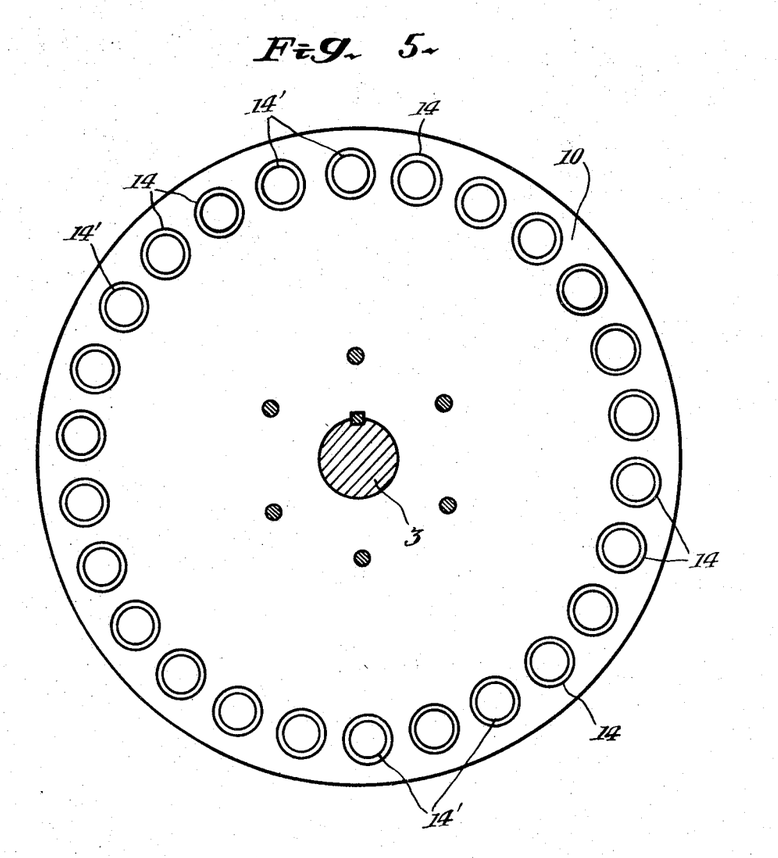
FIG. 5 is a front elevational view of the molding disc.

Reference numerals 12 and 13 indicate individual two mold supports, respectively, which are in turn supported by respective discs 9 and 11 in symmetrical opposite relation and two cooperating molds such as the male and female molds are movable toward and away from each other within the confines of the supplementary or molding disc 10 and more particularly in respective molding apertures 14, 14' formed therein.

Figure 6:
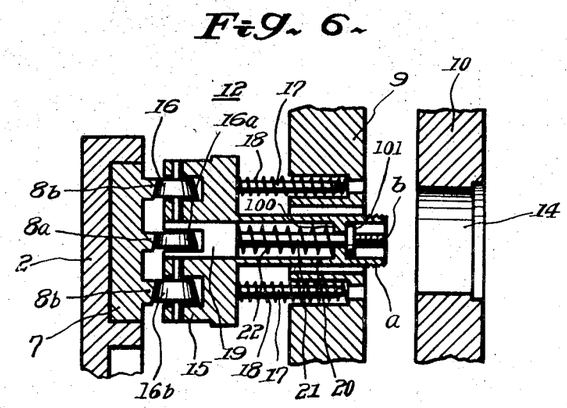
FIG. 6 is an enlarged fragmentary view showing the relation between one of the molds and the associated set of cams.

As shown in FIG. 6, the mold supports 12 each include a base plate 15 which carries on one side and adjacent the opposite ends of the plate rollers, 16a and 16b in engagement with the respective annular cams, 8a and 8b mounted on the adjacent support bracket 7. Secured to the other side of the base plate 15 are studs 17 which extend toward and into the associated disc 9 and are surrounded by respective coil springs 18 seated between the base plate 15 and associated disc 9. Formed on the same side of the base plate 15 centrally thereof is a tubular support 20 which is slidably fitted in the disc 9 to extend beyond the latter and is externally threaded at the end, as indicated by a. A slide 19 is accommodated in the tubular support 20 adjacent to its one end for axial sliding movement relative to the support 20. The slide 19 carries at its outer end a roller 16a which is held in contacting engagement with the adjacent annular cam 8a.

Integrally secured to the inner end of slide 19 is a collared plunger rod 21 which is fitted in the tubular support 20 inwardly through its threaded end a. A coil spring 22 encircles the plunger rod 21 and is seated at one end on the slide 19 and at the other end on the bottom wall 100 of the tubular support 20, through which the plunger rod 21 extends, as shown. On that side of the bottom wall which is remote from the coil spring 22, the plunger rod 21 has an integral collar 101 and is threaded at the adjacent end as at b. It is to be noted that the base plate 15 and slide 19 are normally so biased by springs 18 and 22 that rollers 16, 16a and 16b are at all times held in pressure contact with the respective annular cams 8, 8a and 8b. Thus, the base plate 15 is actuated together with its integral tubular support 20 toward and away from the intermediate disc 10 in accordance with the configuration of annular cams 8 and 8b while the slide 19 and hence support rod 21 are actuted, independently of the base plate 15 and tubular support 20, toward and away from the disc 10 solely in accordance with the configuration of the annular cam 8a.

The die or mold supports 13 are of the same construction as the mold supports 12 described above and are mounted on the disc 11 in aligned opposite relation to the respective mold supports 12. In some cases the slide 19 may conveniently be omitted from each of the female-mold supports 13.

The pairs of aligned mold supports 12 and 13, of the construction described, are arranged circumferentially at appropriate intervals to rotate together with the rotary structure including discs 9, 10 and 11. Heated plastic material P is fed between the mold disc 9 and molding disc 10 from a feed device 23 having heating means. The pair of coperating molds are moved toward and away from each other as they are carried by the respective rotary discs 9 and 11 about the axis of the rotative shaft 3 and thus cooperate with each other and with the associated molding aperture 14 of the supplementary rotary disc 10 to form and punch the fed material. The products thus molded are pushed out of the supplementary molding disc 10 into the spacing between the disc 10 and the second mold carrying disc 11 and scraped off, for example, by a bladed wheel 24 fixedly mounted on the shaft of a pinion gear 26, which is in mesh with an annular gear 25 formed around the periphery of the second mold carrying disc 11.

Figure 8:
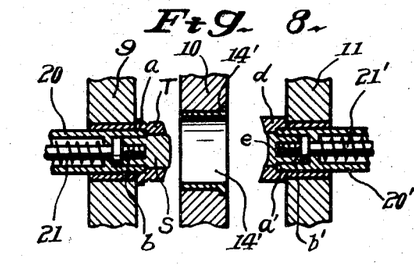
FIG. 8 is a fragmentary cross section illustrating the aligned spaced relation between the molding and mold-carrying discs, and taken through one of the mold pairs.
Figure 10:
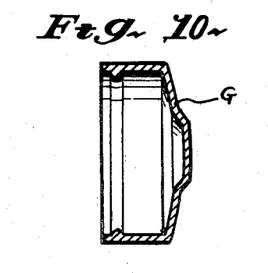

When it is desired to fabricate plastic caps, for example, such as shown in FIG. 10 and indicated by letter G, the male mold should be comprised, as shown in FIG. 8, of a peripheral piece T which corresponds in external configuration to the inner peripheral shape of cap G and a separately operable central piece S. The peripheral and central mold pieces T and S are threadably fitted to the threaded end $a$ of tubular support 20 and the threaded end portion $b$ of plunger rod 21, respectively. Similarly, the second mold such as female mold $d$ usable in this instance is divided into two pieces, peripheral and central, which are threadably fitted to the respective threaded ends $a'$ of tubular support 20' and plunger rod 21' of the associated second mold support 13 and cooperate to form an end surface corresponding in configuration to the external end surface of cap G. Fitted in each of the molding apertures 14 of molding disc 10 is a bushing 14' of the internal diameter corresponding to the external diameter of cap G, which bushing receives the pair of molds when they are actuated to move toward and away from each other.

Figure 7:
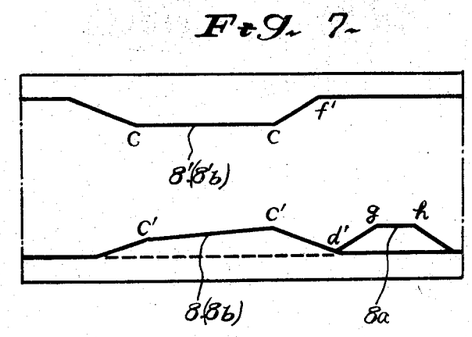
FIG. 7 is a fragmentary development of the two sets of cams.

In this case, the annular cams 8, 8a and 8b mounted on one of the support brackets 2 and those 8', 8'a and 8'b on the other support bracket 2 are contoured as shown diagrammatically in FIG. 7. Namely, on the side to which the material P is fed, the cooperating annular cams 8' and 8'b act between the two points $e'$ to advance the second or female molds $d$ successively into associated bushings 14' while the cooperating annular cams 8 and 8b act between the two points $e$ to advance the first or male molds into the respective bushings 14' so that the first and second molds cooperate to perform the desired molding and severing function during passage between the points $c'$—$c'$ and $c$—$c$. Subsequently, the two molds are successively retracted at respective points $f$ and $d'$ on the cam configurations of FIG. 7, each male mold carrying on its end a product just molded. Then, annular cam 8a acts at $g$ to advance the slide 19 and hence the plunger rod 21 to push the molded product off the peripheral mold piece T and through the associated aperture 14. The cam 8a then acts at $h$ to retract the slide and plunger rod. The configurations of these annular cams are such that said two molds such as the male and female molds are subjected to these advancing and retracting movements during their rotation.

Figure 11:
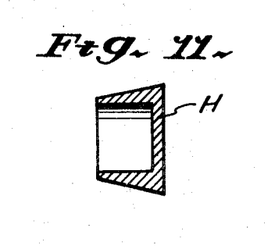

For production of caps such as indicated by H in FIG. 11, substantially the same process is to be followed. Namely, a first mold T' conforming to the inner shape of the cap H is threadably fitted to the tubular support 20 and a push rod S' is secured to the adjacent end of the plunger rod 21. On the opposite or female-mold side, the tubular support 20' carries a second mold $d$ threadably secured thereto and a bushing or sleeve 14' shaped in cross section as shown is fitted in the molding section 14. For such first and second molds T' and $d'$, annular came substantially similar to those used for the molds T and $d$ are usable but, for accuracy in operation, use of annular cams specially designed for production of caps of the shape H in place of those for production of caps of the shape G may be recommendable. In either case, one of the annular cams 8'a associated, with the second molds or die blocks or female molds $d'$ is to be of no use and actually ineffective.

Figure 9:
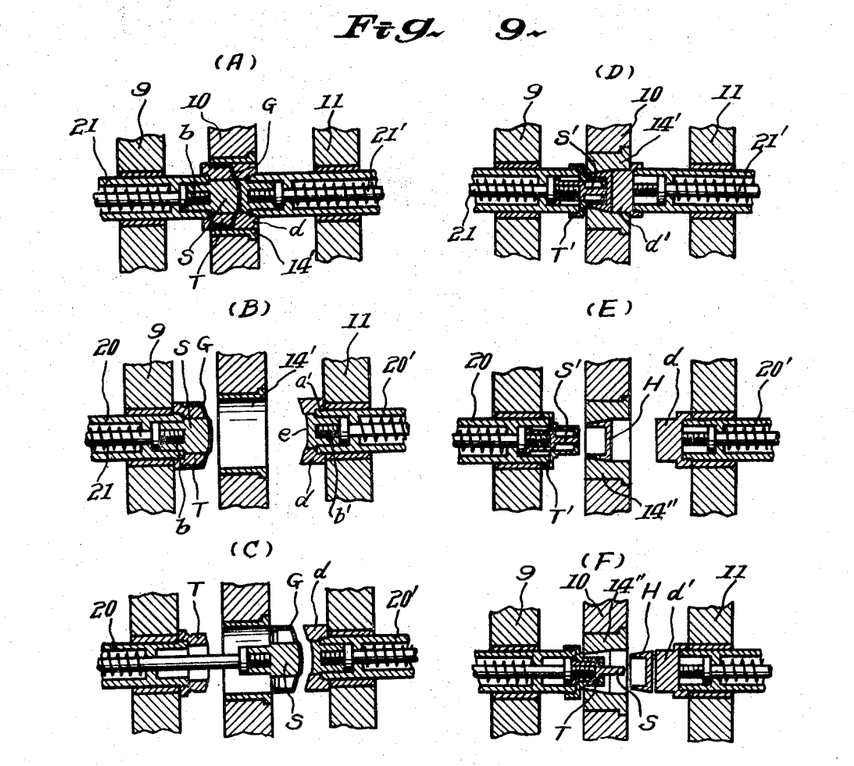
FIGS. 9A, 9B and 9C illustrate successive stages in the process of making the article shown in FIG. 10.
FIGS. 9D, 9E and 9F illustrate successive stages in the process of making the article shown in FIG. 11.

In operation of this apparatus, as the material P heated to an appropriate working temperature is fed between the first mold carrying disc 9 and the supplementary molding disc 10, the second mold supports 13 are advanced riding over the high range $c$—$c$ of the annular cams 8' and 8'b so that the second molds $d$ are each advanced into the associated bushing 14'. Subsequently, the first mold supports 12 are advanced riding over the high range $c'$—$c'$ of the annular cams 8 and 8b so that the first molds T are each advanced into the associated bushing 14' together with the material P thereby forming it into the desired shape and simultaneously cutting it along its periphery, as shown in FIG. 9(D). Thereafter, passing the slope $c'$—$f'$ on the annular cams 8' and 8'b the seconds molds $d$ are retracted whereas the first molds T passing the slope $c'$—$d'$ on the annular cams 8 and 8b are each retracted together with the molded article G, which covers the end of the first mold, as shown in FIG. 9(B). Subsequently, the slide 19 is moved forward riding over the high portion $g$–$h$ of the annular cam 8a, as shown in FIG. 9(C). Being thus advanced together with the slide 19, the pusher rod S acts to push out the molded article G into the spacing between the supplementary molding disc 10 and the second mold carrying disc 11 and the article G is immediately scraped out of the machine by bladed wheel 24. Obviously, this process of molding and punching articles G from material P is successively performed in a continuous fashion while the rotary structure including said two molding discs and the supplementary molding disc are in rotation. Articles H can apparently be manufactured through substantially the same process including the steps shown in FIGS. 9D, 9E and 9F.

To summarize, two cooperating molds such as the male and female molds in this invention are carried by the respective mold carrying discs or platens and cooperate to mold articles within the confines of a molding disc arranged between the two mold carrying discs for rotation therewith. With such construction, it will be readily appreciated that the molds are actuatable with increased accuracy to mold quality articles with satisfactory efficiency and that the replaceable mounting of the molds renders it possible to fabricate caps of different shapes as desired.

The invention is not restricted to the features described above and shown in the drawings but may be varied in many ways within the scope of the appendant claim.

What I claim is:

1. An automatic plastic cap molding machine of the type including rotary means carrying pairs of molds in alignment with each other and annular cam means operable to move each pair of molds toward and away from each other to effect a forming and punching operation, said machine comprising in combination pairs of molds replaceably mounted on respective rotary discs by tubular means slidably engaging a respective rotary disc, said molds each being secured to an end of a tubular means and being larger in diameter than said tubular means to protrude from adjacent sides of said rotary discs towards each other, a supplementary molding disc interposed between said rotary discs for rotation therewith and having a plurality of circumferentially spaced apertures therein so formed that each pair of aligned said molds are cooperable within individual apertures in said supplementary molding disc, third mold means positioned in said apertures to cooperate with said pairs of molds for completing molding and punching action therewith whereby only one advance and retraction of each of said pairs of molds is required for a complete cap forming action, which cap can be separated from a said mold by one additional advance movement.

2. An automatic plastic cap molding machine as in claim 1 where said pairs of molds are removably carried by said tubular means and comprise a male mold and a female mold, said male mold having an independently positioned and movable knock-out center member, and an end section forming a part of said male mold on and removably secured to said center member.

3. An automatic plastic cap molding machine of the type including rotary means carrying pairs of molds in alignment with each other and annular cam means operable to move each pair of molds toward and away from each other to effect an operative forming and punching operation, said machine comprising in combination pairs of molds replaceably mounted on respective rotary discs, a supplementary molding disc interposed between said rotary discs for rotation therewith and so formed that each pair of aligned said molds are cooperable within apertures in said supplementary molding disc, third mold means positioned in said apertures to cooperate with said pairs of molds for completing molding and punching action therewith, one of said discs carrying male molds and the other disc carrying female molds, said mold cavity forming means converging inwardly towards said male mold and the formed parts can only be removed in the direction of towards said female molds from said supplementary molding disc, the forming material being introduced from the male mold side of said supplementary molding disc.

4. An automatic plastic cap molding machine as in claim 3 where said pairs of molds are removably carried by said tubular means and being a male mold and a female mold, said male mold having an independently positioned and movable knock-out center member, an end section forming a part of said male mold on and removably secured to said center member.

References Cited

UNITED STATES PATENTS

| 1,844,700 | 2/1932 | Stokes | 18—20 |
| 1,991,706 | 2/1935 | Seabury | 18—20 |
| 2,748,424 | 6/1956 | Fay | 18—20 |
| 3,418,691 | 12/1968 | Hanai. | |

WILLIAM S. LAWSON, Primary Examiner

L. GILDEN, Assistant Examiner

U.S. Cl. X.R.

18—2, 19

UNITED STATES PATENT OFFICE
CERTIFICATE OF CORRECTION

Patent No. 3,568,255                  Dated March 9, 1971

Inventor(s) Mikihiko Hanai

It is certified that error appears in the above-identified patent and that said Letters Patent are hereby corrected as shown below:

Column 1, line 49, change "if" to -- it --.

Column 2, line 41, before "16a", insert -- 16 --.

Column 2, line 42, before "8a", insert -- 8 --.

Column 3, line 17, change "coperating" to -- cooperating --.

Column 3, line 56, change "e' " to -- c' --.

Column 3, line 59, change "e" to -- c --.

Column 4, line 10, change "came" to -- cams --.

Signed and sealed this 13th day of July 1971.

(SEAL)
Attest:

EDWARD M. FLETCHER, JR.          WILLIAM E. SCHUYLER, J
Attesting Officer                 Commissioner of Patent